(12) United States Patent
Kamakaris

(10) Patent No.: US 8,934,849 B2
(45) Date of Patent: Jan. 13, 2015

(54) SYSTEM AND METHOD FOR CONFIRMING RADIO FREQUENCY (RF) SIGNAL CONNECTIVITY WITH DEVICE UNDER TEST (DUT)

(71) Applicant: Litepoint Corporation, Sunnyvale, CA (US)

(72) Inventor: Theodoros Kamakaris, San Jose, CA (US)

(73) Assignee: Litepoint Corporation, Sunnyvale, CA (US)

(*) Notice: Subject to any disclaimer, the term of this patent is extended or adjusted under 35 U.S.C. 154(b) by 204 days.

(21) Appl. No.: 13/791,127

(22) Filed: Mar. 8, 2013

(65) Prior Publication Data
US 2014/0256269 A1 Sep. 11, 2014

(51) Int. Cl.
G01R 27/06 (2006.01)
H04B 17/00 (2006.01)

(52) U.S. Cl.
CPC .................................. H04B 17/0085 (2013.01)
USPC ...................... 455/67.14; 324/638; 455/67.11

(58) Field of Classification Search
USPC ........ 455/67.11, 67.14, 67.16, 67.7; 324/600, 324/638
See application file for complete search history.

(56) References Cited

PUBLICATIONS

Agilent Technologies, Inc., Agilent Network Analyzer Basics, pp. 1-94, printed Aug. 31, 2004, 5965-7917E: cp.literature.agilent.com/litweb/pdf/5965-7917E.pdf.*
U.S. Appl. No. 13/791,098, filed March 8, 2013, "System and Method for Confirming Radio Frequency (RF) Signal Connection Integrity With Multiple Devices Under Test (DUTS) to Be Tested Concurrently"; 39 Pages.

* cited by examiner

Primary Examiner — Blane J Jackson
(74) Attorney, Agent, or Firm — Vedder Price, P.C.

(57) ABSTRACT

A system and method for confirming radio frequency (RF) signal connectivity integrity with a device under test (DUT). An output RF signal is provided to a RF signal port and looped back for analysis along with an input RF signal, which includes a reflected signal component related to the output RF signal, from the RF signal port. By measuring magnitudes of combinations of the input and loopback RF signals, e.g., at multiple signal frequencies, it can be determined whether the RF signal port is properly terminated by the DUT.

10 Claims, 8 Drawing Sheets

SYSTEM AND METHOD FOR CONFIRMING RADIO FREQUENCY (RF) SIGNAL CONNECTIVITY WITH DEVICE UNDER TEST (DUT)

BACKGROUND

The present invention relates to testing electronic communication systems, and in particular, to testing radio frequency (RF) communication systems.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When designing such devices, engineers take extraordinary care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems employ a subsystem for analyzing signals received from each device. Such subsystems typically include at least a vector signal analyzer (VSA) for analyzing signals produced by the device, and a vector signal generator (VSG) for generating signals to be received by the device. The analyses performed by the VSA and the signals generated by the VSG are generally programmable so as to allow each to be used for testing a variety of devices for adherence to a variety of wireless technology standards with differing frequency ranges, bandwidths and signal modulation characteristics.

As part of the manufacturing of wireless communication devices, one significant component of product cost is manufacturing test cost. Typically, there is a direct correlation between the cost of test and the time required to perform such test. Thus, innovations that can shorten test time without compromising test accuracy or increasing capital equipment costs (e.g., increasing costs due to increasing sophistication of test equipment, or testers) are important and can provide significant cost savings, particularly in view of the large numbers of such devices being manufactured and tested.

One way of ensuring that test time is minimized is to confirm connectivity between the test system (or "tester) and the device under test (DUT). In other words, confirming the integrity of the cabled signal connections between the tester and DUT prior to initiation of testing will avoid test time otherwise wasted collecting meaningless signal data when connection to the DUT is nonexistent or faulty. This will save time involved in running a test sequence as well as processing of false test results.

Accordingly, it would be desirable to have a test system and method for confirming RF signal connectivity integrity between signal ports of a test system and DUT.

SUMMARY

In accordance with the presently claimed invention, a system and method are provided for confirming radio frequency (RF) signal connectivity integrity with a device under test (DUT). An output RF signal is provided to a RF signal port and looped back for analysis along with an input RF signal, which includes a reflected signal component related to the output RF signal, from the RF signal port. By measuring magnitudes of combinations of the input and loopback RF signals, e.g., at multiple signal frequencies, it can be determined whether the RF signal port is properly terminated by the DUT.

In accordance with an exemplary embodiment of the presently claimed invention, a test system for confirming radio frequency (RF) signal connectivity integrity with a device under test (DUT) includes: a RF signal port to convey input and output RF signals, wherein the input RF signal includes a reflected signal component related to the output RF signal; RF signal source circuitry to provide the output RF signal with one or more RF signal frequencies; RF signal analysis circuitry responsive to the input RF signal and a loopback RF signal related to the output RF signal by providing one or more measurement signals indicative of magnitudes of respective combinations of the input RF signal and the loopback RF signal at each of the one or more RF signal frequencies; and signal routing circuitry coupled to the RF signal port, the RF signal source circuitry and the RF signal analysis circuitry, and to convey the output RF signal from the RF signal source circuitry to the RF signal port, the loopback RF signal to the RF signal analysis circuitry, and the input RF signal from the RF signal port to the RF signal analysis circuitry.

In accordance with another exemplary embodiment of the presently claimed invention, a method of confirming radio frequency (RF) signal connectivity integrity with a device under test (DUT) includes: providing, with RF signal source circuitry, an output RF signal with one or more RF signal frequencies; routing, with signal routing circuitry, the output RF signal from the RF signal source circuitry to a RF signal port, a loopback RF signal, which is related to the output RF signal, to RF signal analysis circuitry, and an input RF signal from the RF signal port to the RF signal analysis circuitry, wherein the input RF signal includes a reflected signal component related to the output RF signal; and responding, with the RF signal analysis circuitry, to the input RF signal and the loopback RF signal by providing one or more measurement signals indicative of magnitudes of respective combinations of the input RF signal and the loopback RF signal at each of the one or more RF signal frequencies.

DETAILED DESCRIPTION

Figure 1:
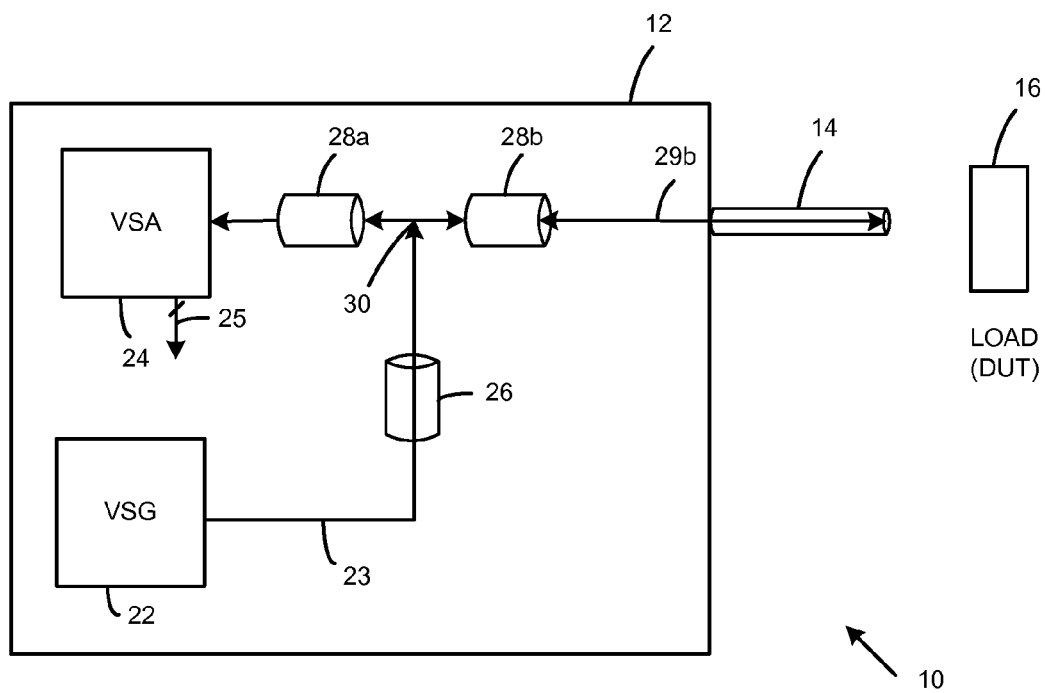
FIG. 1 depicts a RF signal testing system for testing a DUT in accordance with exemplary embodiments of the presently claimed invention.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

As is well known in the art, when RF signals are conveyed from a signal source to a load, matching of the output impedance of the source, impedance of the connections (e.g., transmission line cables and connectors) and impedance of the load determine whether and to what degree signal components are reflected back from the load toward the RF signal source. Generally, such reflected signal components will have lower and higher magnitudes when such impedances are well matched and poorly matched, respectively. For example, if the input impedance of the signal connections is not matched with that of the signal source, as in the case of a faulty connection between the test system and the connections or load, the reflected signal components received by the RF signal source will have higher magnitudes. Differences in reflected signal component magnitudes can be detected and observed, e.g., by the RF signal analysis subsystem of the test system (e.g., a VSA).

In accordance with exemplary embodiments of the presently claimed invention, an RF signal source (e.g., a VSG) transmits a continuous wave (CW) signal that is provided in such a manner that it divides into a forward signal component directed toward the load (DUT) and a reverse component (e.g., a loopback signal) directed toward the receive signal analysis subsystem.

If the input/output (I/O) port of the tester and/or the external signal connections are not terminated (e.g., no DUT is connected), the effective terminal impedance as seen by the tester is extremely high (e.g., approaching infinity), thereby causing a reflected signal wave with a large magnitude to be conveyed back toward the RF signal analysis subsystem, combining with the loopback signal component through constructive and destructive interference, in accordance with well known principles. This combination signal of the loopback and reflected signal components from an open, or non-terminated, connection is the "open path" reference.

On the other hand, if a load is connected, the terminal impedance will differ significantly and be much closer to matching the characteristic impedance of the test system and signal connections. Thus, absent a defect in any of the other signal connections, the magnitude of any reflected signal component will be significantly smaller and, therefore, detectably different, compared to that caused by the non-terminated situation producing the "open path" reference. This difference in the reflected signal components can be detected by the RF signal analysis subsystem, which can then determine if there is a fault in test signal connectivity.

In accordance with the presently claimed invention, the DUT need not necessarily be operating nor providing any signals via the test connection. Accordingly, signal connectivity testing in accordance with the presently claimed invention can be practiced in conjunction with automated handling processes and detect connectivity faults before the DUT is powered up or otherwise operational.

Referring to FIG. 1, in accordance with exemplary embodiments of the presently claimed invention, a test system 10 for confirming RF signal connectivity integrity includes a tester 12 and external connections 14 (e.g., a RF signal cable and associated RF signal connectors) for connecting to the DUT 16. The tester 12 includes a VSG 22, a VSA 24 and signal routing circuitry 30 (discussed in more detail below), which connects to the VSG 22, VSA 24 and external signal connections 14 via internal signal connections 26, 28a, 28b (e.g., RF signal cables). The VSG 22 provides the RF test signal 23 (discussed in more detail below) and the VSA 24 provides one or more test signals 25 indicative of the status of connectivity of the tester 12 and the DUT 16.

Figure 2:
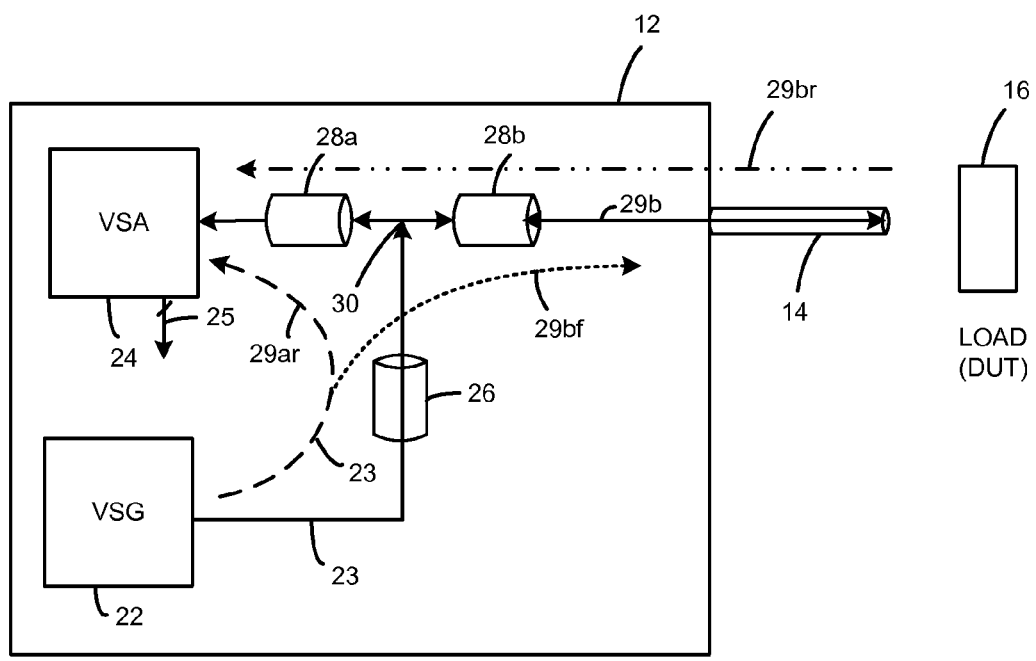
FIG. 2 depicts the testing system of FIG. 1 during a connectivity test with no DUT connected.

Referring to FIG. 2, due to the action of the signal routing circuitry 30, the RF test signal 23 divides into a forward, or incident, signal component 29bf directed toward the external signal connections 14 and load 16, and a reverse component 29ar directed toward the VSA 24. In the case of a non-terminated external connection 14, e.g., as depicted here with the DUT 16 not connected, a significant reflected test signal component 29br is produced and conveyed via the external 14 and internal 28a, 28b signal paths to the VSA 24.

Figure 3:
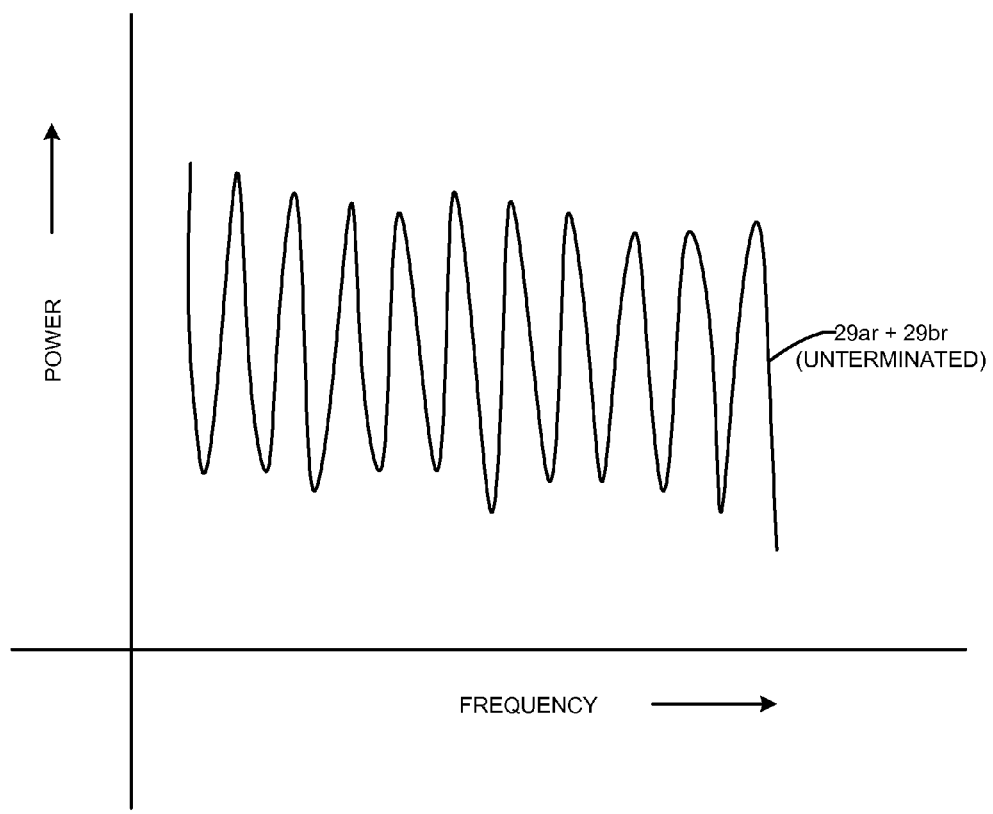
FIG. 3 depicts the received test signal during the testing conducted in FIG. 2.

Referring to FIG. 3, the combined reverse original 29ar and reflected 29br signal components, which are summed (29ar+29br) through constructive and destructive interference, will have a magnitude that will vary in accordance with the frequency of the test signal 23 (due to the dependence of the effective length of the signal path upon frequency in terms of signal wavelength).

Figure 4:
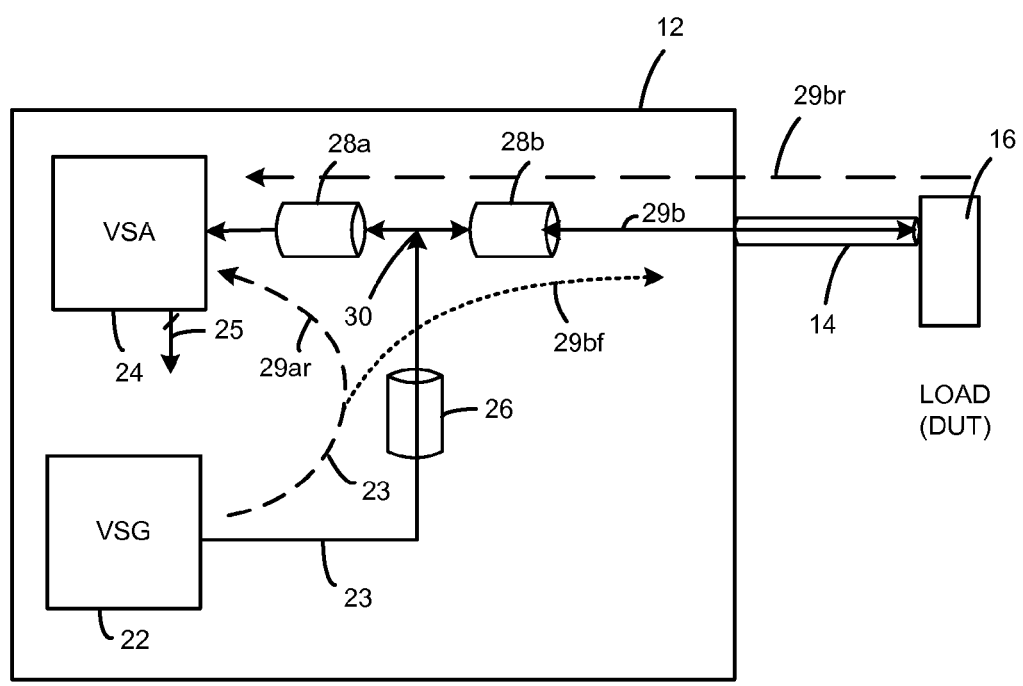
FIG. 4 depicts the testing system of FIG. 1 during a connectivity test with a DUT connected.

Referring to FIG. 4, with the DUT 16 connected to the tester 12 via the external connections 14 (e.g., a RF cable having the requisite characteristic impedance), any reflected signal component 20br resulting will be significantly reduced in magnitude. Nonetheless, as before, this reflected signal component 29br will combine with the original reverse signal component 29ar.

Figure 5:
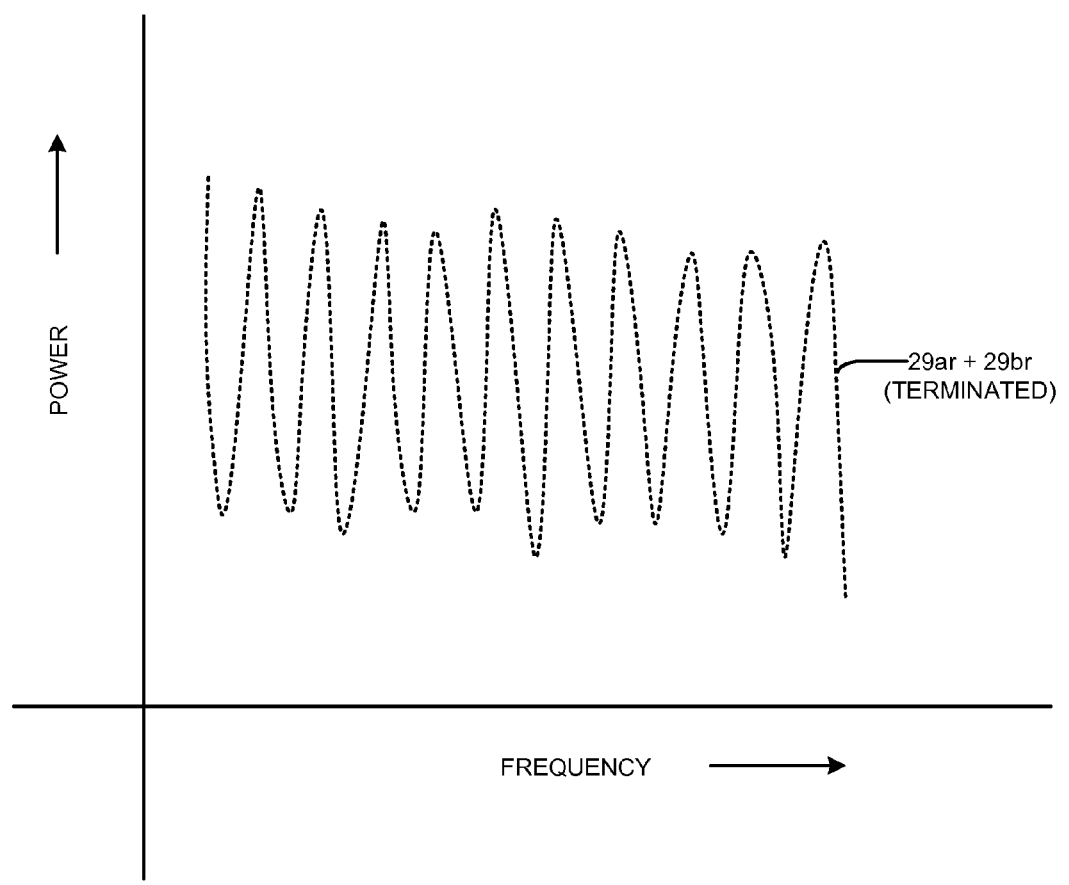
FIG. 5 depicts the received signal during the testing conducted in FIG. 4.

Referring to FIG. 5, the resulting combined signal 29ar+29br, while still having a magnitude that varies with frequency, will be reduced overall in magnitude.

Figure 6:
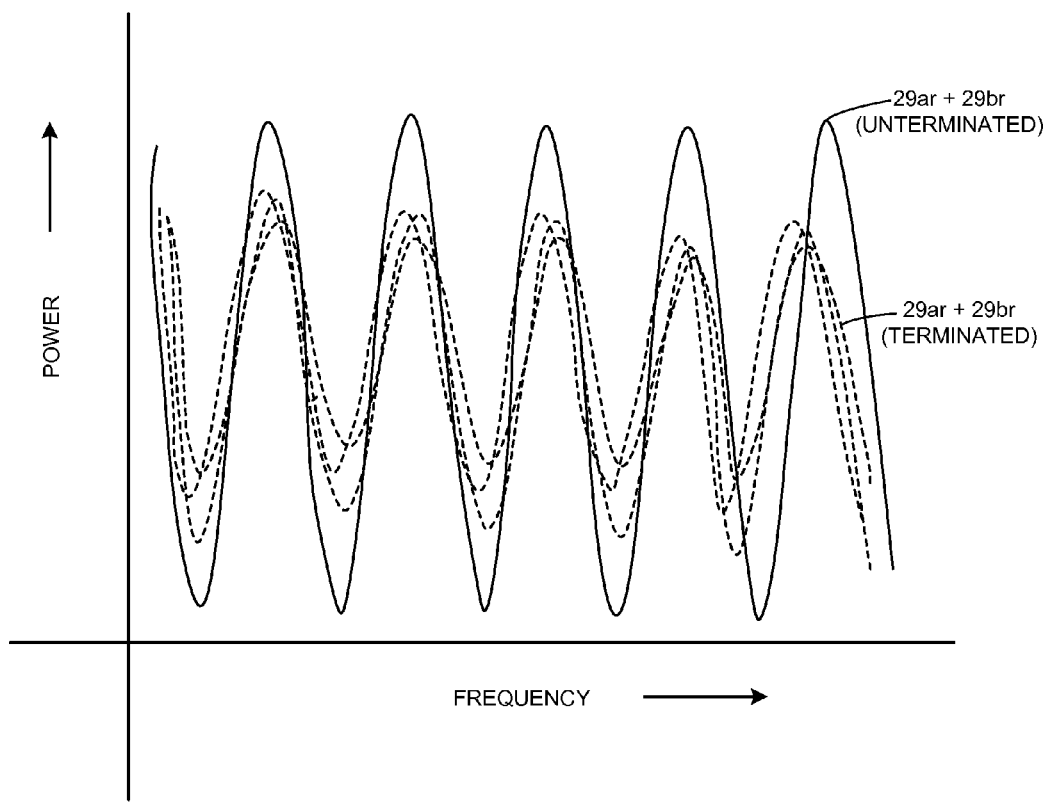
FIG. 6 depicts the signals of FIGS. 3 and 5 together to illustrate differences in received signal magnitude and phase dependent upon DUT connectivity status.

Referring to FIG. 6, as can be readily seen, the relative magnitudes of the combined reverse component 29ar and reflected component 29br signals in the non-terminated and terminated situations differ significantly, irrespective of signal frequency, and will be readily detected by the VSA 24, which provides one or more test signals 25 indicative of the measured differences between these signals. In other words, even though the reflected signal phase will vary over frequency and will be dependent upon the ratio of the signal wave length and the effective length of the signal connections (external 14 and internal 28*a*, 28*b*), the magnitudes for the non-terminated and terminated signal conditions will still be significantly, and detectably, different.

Figure 7:
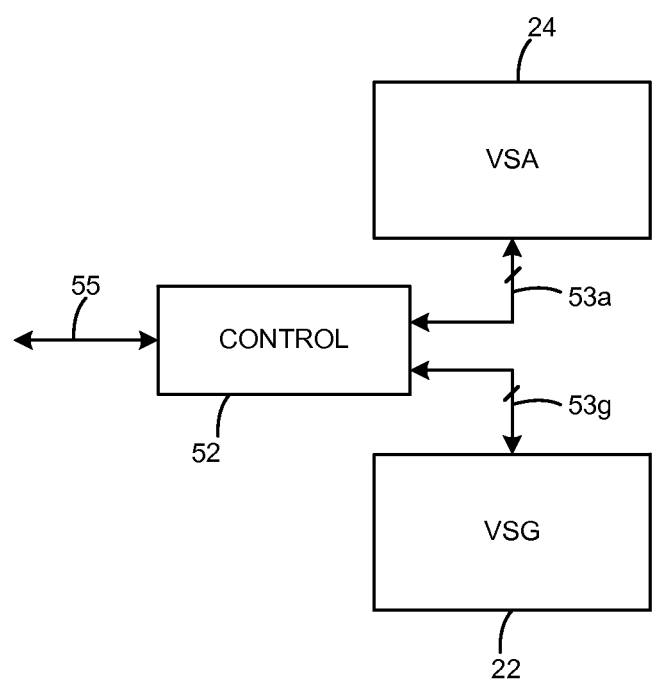
FIG. 7 depicts an exemplary embodiment of a control technique for the testing system of FIG. 1.

Referring to FIG. 7, the VSG 22 and VSA 24 are typically controlled via a controller 52. This controller 52 can be internal, or resident, within the test system 12 (FIG. 1) and communicate commands and data with an external controller, external circuitry or systems (not shown) via one or more signals 55. Alternatively, the controller 52 can be external, and communicate commands and data with the VSG 22 and VSA 24 via signals 53*g*, 53*a*.

Figure 8:
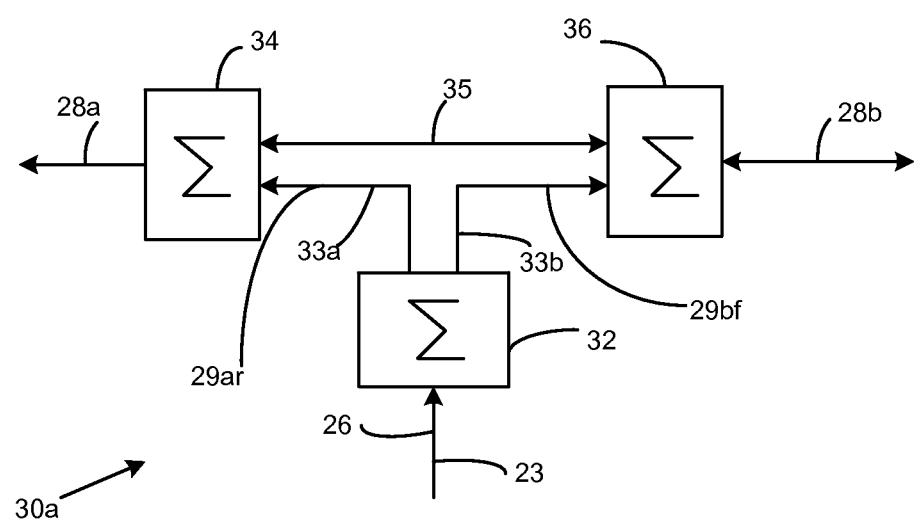
FIG. 8 depicts an exemplary embodiment of signal routing circuitry for use in the tester of FIG. 1.

Referring to FIG. 8, an exemplary embodiment 30*a* of the signal routing circuitry 30 (FIG. 1) can include signal combining/splitting circuits 32, 34, 36, interconnected substantially as shown. As discussed above, the test signal 23 divides to provide the forward 29*bf* and reverse 29*ar* test signal components. This signal splitting occurs within the first signal combining/splitting circuit 32 with these signal components 29*ar*, 29*bf* being conveyed to the other signal combining/splitting circuits 34, 36 via signal connections 33*a*, 33*b*, and ultimately conveyed via the internal signal connections 28*a*, 28*b*, as discussed above. The reflective signal component 29*br* (FIG. 2) arrives via the internal signal connection 28*b* and is conveyed to the VSA 24 via the other signal combining/splitting circuits 34, 36 and signal connections 35, 28*a*. (Alternatively, in place of such signal combining/splitting circuits, directional couplers can also be used in accordance with well known techniques.)

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a test system for confirming radio frequency (RF) signal connectivity integrity with a device under test (DUT), comprising:
   a RF signal port to convey input and output RF signals, wherein said input RF signal includes a reflected signal component related to said output RF signal;
   RF signal source circuitry to provide said output RF signal with one or more RF signal frequencies;
   RF signal analysis circuitry responsive to said input RF signal and a loopback RF signal related to said output RF signal by providing one or more measurement signals indicative of magnitudes of respective combinations of said input RF signal and said loopback RF signal at each of said one or more RF signal frequencies; and
   signal routing circuitry coupled to said RF signal port, said RF signal source circuitry and said RF signal analysis circuitry, and to convey
      said output RF signal from said RF signal source circuitry to said RF signal port,
      said loopback RF signal to said RF signal analysis circuitry, and
      said input RF signal from said RF signal port to said RF signal analysis circuitry.

2. The apparatus of claim 1, wherein said RF signal source circuitry comprises a vector signal generator.

3. The apparatus of claim 1, wherein said RF signal analysis circuitry comprises a vector signal analyzer.

4. The apparatus of claim 1, wherein said signal routing circuitry comprises one or more of signal coupling circuitry, signal dividing circuitry and signal summing circuitry.

5. The apparatus of claim 1, wherein said one or more measurement signals have at least first and second values when a DUT is coupled and not coupled, respectively, to said RF signal port.

6. A method of confirming radio frequency (RF) signal connectivity integrity with a device under test (DUT), comprising:
   providing, with RF signal source circuitry, an output RF signal with one or more RF signal frequencies;
   routing, with signal routing circuitry,
      said output RF signal from said RF signal source circuitry to a RF signal port,
      a loopback RF signal, which is related to said output RF signal, to RF signal analysis circuitry, and
      an input RF signal from said RF signal port to said RF signal analysis circuitry, wherein said input RF signal includes a reflected signal component related to said output RF signal; and
   responding, with said RF signal analysis circuitry, to said input RF signal and said loopback RF signal by providing one or more measurement signals indicative of magnitudes of respective combinations of said input RF signal and said loopback RF signal at each of said one or more RF signal frequencies.

7. The method of claim 6, wherein said providing, with RF signal source circuitry, an output RF signal comprises providing said output RF signal with a vector signal generator.

8. The method of claim 6, wherein said routing comprises routing said output RF signal, said loopback RF signal and said input RF signal with one or more of signal coupling circuitry, signal dividing circuitry and signal summing circuitry.

9. The method of claim 6, wherein said responding, with said RF signal analysis circuitry, to said input RF signal and said loopback RF signal comprises responding with a vector signal analyzer.

10. The method of claim 6, wherein said providing one or more measurement signals comprises providing said one or more measurement signals with at least first and second values when a DUT is coupled and not coupled, respectively, to said RF signal port.

* * * * *